July 16, 1935.  E. R. BOOTS  2,008,347
HEADLIGHT DIMMING MEANS
Original Filed Jan. 27, 1933
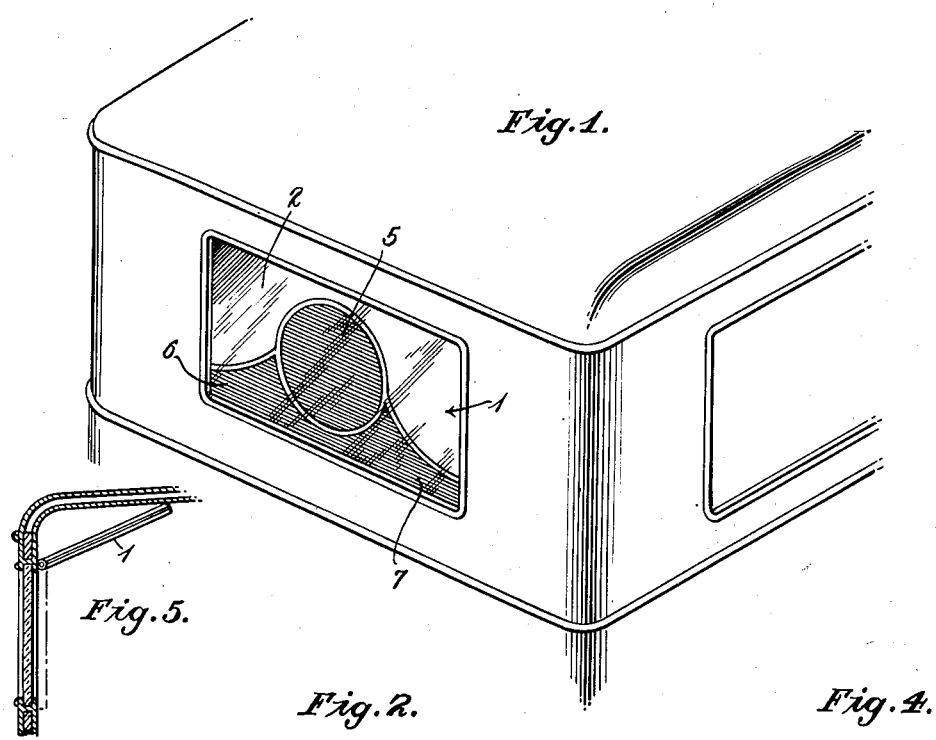
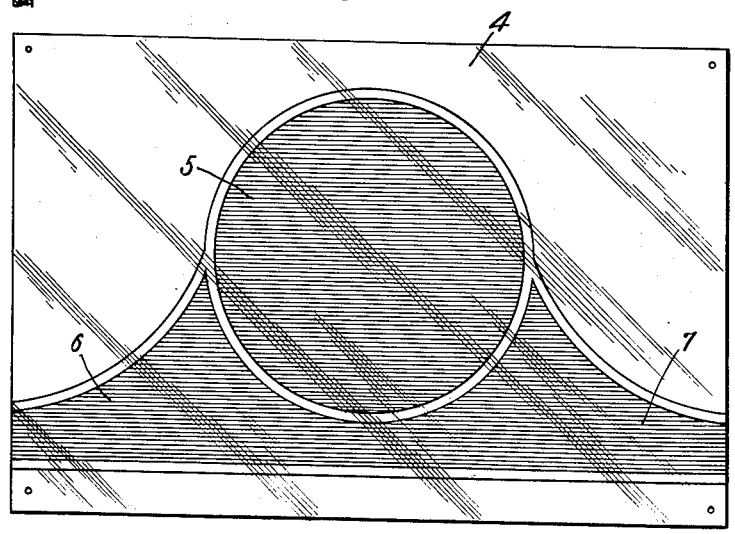
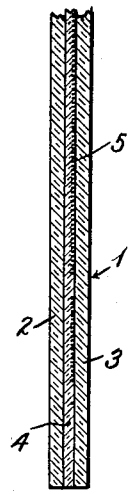
Inventor
E. R. Boots Patented July 16, 1935

2,008,347

UNITED STATES PATENT OFFICE 2,008,347

HEADLIGHT DIMMING MEANS

Edmund R. Boots, New York, N. Y.

Application January 27, 1933, Serial No. 653,889
Renewed April 20, 1935

1 Claim. (Cl. 296—97)

This invention relates to a headlight dimming means for windows and has particular utility as a rear window for automobiles.

An object of the invention is to provide a window with a light diffusing area so constructed and arranged as to reduce the intensity of a beam of light without substantially impairing visibility therethrough.

Another object of the invention is to provide a laminated window structure with a protective sheet having a light diffusing area printed or otherwise placed thereon.

Another object of the invention is to provide a light diffusing area disposed centrally with respect to the glass while leaving other portions of the glass unaffected for clear visibility.

Numerous other objects of the invention will be apparent to those skilled in the art from a reading of the following specification in conjunction with the drawing attached hereto and forming a part hereof, in which:

Figure 1 is a view of my rear window in position on a car.

Figure 2 is a view of the celluloid strip.

Figure 3 is an end view of the laminated structure.

Figure 4 is a sectional view thereof.

Figure 5 is a modification of the device showing how it may be swung to different positions similar to a vizor.

Referring now specifically to the drawing I designates my window which, as stated, has especial utility as the rear window of an automobile or other vehicle. Preferably it is composed of two sheets of glass 2 and 3 having disposed between the same a protective sheet 4 which preferably is made from plastic cellulose-like material and known to the commercial art as "safety glass". I have discovered that this protective sheet of plastic material may be treated to provide thereon a light diffusing medium. In practice this is preferably done by printing the same with opaque dots distributed uniformly over the light diffusing area which act then as a solid color screen, or a graduated dimming area may be made by varying the density of the size of the dots if half-tone printing is used or by varying the width of the lines if Ben Day printing is used.

After this treatment the laminations are secured together in the manner well known to the art and the resultant structure provides desirable dimming instrumentalities without the employment of adjunctive devices heretofore used unsuccessfully in the art.

In the use of automobiles a rear vision mirror is conventionally employed and the beam of light from the rearwardly approaching car is transmitted through the conventional rear window to the rear vision mirror into the driver's eyes which is ordinarily more annoying and dangerous than the headlights, customarily dimmed, of the approaching car. Motorists have attempted to solve this problem by providing a darkened rear view mirror which, however, has very little dimming effect and creates a dark cloudy impression which is quite undesirable. It has also been attempted to employ colored celluloid strips fastened to the rear window by means of suction cups but such devices, if they contain sufficient color to effectively reduce the light intensity, make the window so dark as to interfere substantially with light and visibility.

I have discovered that, with the normal rear view mirror adjustment, the headlights of a following car when on approximately level ground seem to appear in the upper portion of the window when the following car is at a considerable distance rearwardly, but as the car approaches the headlight images are brought toward the bottom of the rear window. It is also a fact that normally these images stay in the central area of the rear window except when a car is about to pass or when a car is rounding a curve. The brightest beam area which might be called the axis beam is the annoying part of the light and is only being reflected to the driver's eyes when the following car is on the same axis as the driver's car. When the following car is rounding a curve or is in passing position, the brilliant axis beam will not be reflected and, the reflected light, therefore, is not annoying.

According to my invention, therefore, because of the aforesaid conditions, the dimming area is located in the central line of the mirror and toward the bottom of the window area as indicated by reference numeral 5 and, if desired, this dimming area may slope from the central portion 5 toward the lower right and left hand sides 6 and 7 as shown. As stated this area is formed by printing or otherwise applying suitable treatments to the plastic cellulose sheet before the same has been interposed between the glass sheets to make a unitary structure.

As a variation of my invention the central light diffusing area 5, located substantially at the center of the window may be formed in a manner to provide relatively greater diffusion at the central portion than areas 6 and 7, aforesaid. Or substantially the entire sheet of cellulose may be treated so as to provide a concentrated light diffusing central area with only a slight dimming area at other portions thereof. In either event rearward visibility is not seriously interfered with. It is possible to print or lithograph on the ordinary reinforcing sheet with opaque dots distributed uniformly over the light diffusing area which acts then as a solid screen as above described.

Printing an area in this manner permits of day and night visibility through the rear window which is only slightly reduced from that obtainable through plate glass and this very slight reduction of visibility only takes place in a relatively small windowed area. The balance of the window is entirely clear. As will be apparent to those skilled in the art the light diffusing area instead of being produced by means of printed or similar screen may be produced by neutral colored pigment so dispersed as to break up and diffuse light beams without substantially impairing clear vision. The resultant structure is an integral whole and is quite inexpensive as it requires only a single printing operation in addition to the process normally used in producing safety glass.

As shown in Figure 5, the safety glass window, as above described, may fold up against the ceiling of the car during the daytime in a manner similar to the non-glare shield which folds down from the ceiling in front of the driver's seat to protect his eyes from sun glare.

Furthermore, if desired, he may use a pyralin reinforcing sheet of a neutral color such as gray, for instance, and print the desirable configuration on this pyralin sheet. The result is that there is provided interference to light transmission over the entire area of the sheet with additional interference throughout the printed area.

It will be observed to those skilled in the art that many changes in construction and arrangement of parts or process of manufacture may be resorted to without departing from the spirit of my invention as defined by the following claim.

Having thus described my invention what I claim is:

A safety glass for rear windows of vehicles comprising two sheets of glass with an interposed sheet made from plastic cellulose-like material containing uniformly a neutral color pigment so dispersed as to break up any transmitted beam of light of relatively small intensity, without substantially impairing rear visibility therethrough during day driving, said interposed sheet containing an additional diffusing medium covering a partial area only of the window and being located approximately on the center line of the window and confined substantially to the lower portion thereof, said additional diffusing medium comprising separated portions formed by printing or lithographing the same on said sheet.

EDMUND R. BOOTS.